(12) United States Patent
Buehler et al.

(10) Patent No.: US 9,434,072 B2
(45) Date of Patent: Sep. 6, 2016

(54) VISION-GUIDED ROBOTS AND METHODS OF TRAINING THEM

(71) Applicant: Rethink Robotics, Inc., Boston, MA (US)

(72) Inventors: Christopher J. Buehler, Cambridge, MA (US); Michael Siracusa, Chestnut Hill, MA (US)

(73) Assignee: Rethink Robotics, Inc., Boston, MA (US)

( * ) Notice: Subject to any disclaimer, the term of this patent is extended or adjusted under 35 U.S.C. 154(b) by 631 days.

(21) Appl. No.: 13/621,687

(22) Filed: Sep. 17, 2012

(65) Prior Publication Data

US 2013/0346348 A1 Dec. 26, 2013

Related U.S. Application Data

(60) Provisional application No. 61/662,646, filed on Jun. 21, 2012, provisional application No. 61/676,586, filed on Jul. 27, 2012.

(51) Int. Cl.

| | |
|---|---|
| *G06F 15/18* | (2006.01) |
| *B25J 9/16* | (2006.01) |
| *G06K 9/66* | (2006.01) |
| *G06F 17/00* | (2006.01) |
| *B25J 13/08* | (2006.01) |
| *G06N 99/00* | (2010.01) |
| *B25J 9/00* | (2006.01) |
| *G05B 19/42* | (2006.01) |
| *G06K 9/20* | (2006.01) |
| *G06K 9/62* | (2006.01) |
| *B25J 11/00* | (2006.01) |
| *G06N 5/02* | (2006.01) |
| *G06N 7/00* | (2006.01) |

(52) U.S. Cl.
CPC .............. *B25J 9/163* (2013.01); *B25J 9/0087* (2013.01); *B25J 9/1671* (2013.01); *B25J 9/1676* (2013.01); *B25J 9/1697* (2013.01); *B25J 11/0005* (2013.01); *B25J 13/084* (2013.01); *G05B 19/42* (2013.01); *G06F 17/00* (2013.01); *G06K 9/2081* (2013.01); *G06K 9/6255* (2013.01); *G06K 9/66* (2013.01); *G06N 99/005* (2013.01); *G05B 2219/39451* (2013.01); *G05B 2219/39466* (2013.01); *G05B 2219/40116* (2013.01); *G06N 5/025* (2013.01); *G06N 7/005* (2013.01); *Y10S 901/01* (2013.01); *Y10S 901/03* (2013.01); *Y10S 901/09* (2013.01); *Y10S 901/31* (2013.01); *Y10S 901/46* (2013.01); *Y10S 901/47* (2013.01)

(58) Field of Classification Search
None
See application file for complete search history.

(56) References Cited

U.S. PATENT DOCUMENTS

| | | |
|---|---|---|
| 4,117,605 A | 10/1978 | Kurland et al. |
| 4,952,772 A | 8/1990 | Zana |

(Continued)

FOREIGN PATENT DOCUMENTS

| | | |
|---|---|---|
| EP | 162565 A2 | 11/1985 |
| EP | 1537959 A2 | 6/2005 |

(Continued)

OTHER PUBLICATIONS

PCT International Application No. PCT/US2013/046996, Invitation to Pay Additional Fees mailed on Oct. 18, 2013, 6 pages.

(Continued)

*Primary Examiner* — Kakali Chaki
*Assistant Examiner* — Ababacar Seck
(74) *Attorney, Agent, or Firm* — Morgan, Lewis & Bockius LLP

(57) ABSTRACT

Via intuitive interactions with a user, robots may be trained to perform tasks such as visually detecting and identifying physical objects and/or manipulating objects. In some embodiments, training is facilitated by the robot's simulation of task-execution using augmented-reality techniques.

11 Claims, 7 Drawing Sheets

(56) References Cited

U.S. PATENT DOCUMENTS

| | | | |
|---|---|---|---|
| 5,268,837 A | 12/1993 | Saylor | |
| 5,488,689 A | 1/1996 | Yamato et al. | |
| 5,652,910 A | 7/1997 | Boutaud et al. | |
| 5,739,660 A | 4/1998 | Gnann | |
| 5,783,834 A | 7/1998 | Shatas | |
| 5,938,710 A | 8/1999 | Lanza et al. | |
| 6,353,814 B1 | 3/2002 | Weng | |
| 6,363,301 B1 | 3/2002 | Tackett et al. | |
| 6,438,842 B1 | 8/2002 | Raami | |
| 6,484,083 B1 | 11/2002 | Hayward et al. | |
| 6,760,645 B2 | 7/2004 | Kaplan et al. | |
| 6,826,452 B1* | 11/2004 | Holland et al. | 700/245 |
| 6,941,192 B2 | 9/2005 | Tang et al. | |
| 7,024,276 B2 | 4/2006 | Ito | |
| 7,096,090 B1 | 8/2006 | Zweig | |
| 7,152,050 B2 | 12/2006 | Aoyama et al. | |
| 7,181,314 B2 | 2/2007 | Zhang et al. | |
| 7,209,801 B2 | 4/2007 | Anfindsen et al. | |
| 7,221,983 B2 | 5/2007 | Watanabe et al. | |
| 7,236,618 B1 | 6/2007 | Chui et al. | |
| 7,236,854 B2 | 6/2007 | Pretlove et al. | |
| 7,289,884 B1 | 10/2007 | Takahashi et al. | |
| 7,328,196 B2 | 2/2008 | Peters, II | |
| 7,353,081 B2 | 4/2008 | Skourup et al. | |
| 7,353,082 B2 | 4/2008 | Pretlove et al. | |
| 7,413,565 B2 | 8/2008 | Wang et al. | |
| 7,450,538 B2 | 11/2008 | Apneseth et al. | |
| 7,626,569 B2 | 12/2009 | Lanier | |
| 7,643,907 B2 | 1/2010 | Fuhlbrigge et al. | |
| 7,646,161 B2 | 1/2010 | Albu-Schäffer et al. | |
| 7,720,572 B2 | 5/2010 | Ziegler et al. | |
| 7,720,775 B2 | 5/2010 | Shimomura et al. | |
| 7,826,984 B2 | 11/2010 | Sjolstrand et al. | |
| 7,848,565 B2 | 12/2010 | Goerick et al. | |
| 7,852,355 B2 | 12/2010 | Friedrich et al. | |
| 7,979,162 B2 | 7/2011 | Niemela et al. | |
| 8,022,655 B2 | 9/2011 | Endresen et al. | |
| 8,079,143 B2 | 12/2011 | Zhang et al. | |
| 8,090,475 B2 | 1/2012 | Blanc et al. | |
| 8,099,191 B2 | 1/2012 | Blanc et al. | |
| 8,121,729 B2 | 2/2012 | Blanc et al. | |
| 8,140,188 B2 | 3/2012 | Takemitsu et al. | |
| 8,160,743 B2 | 4/2012 | Birkenbach et al. | |
| 8,185,346 B2 | 5/2012 | Sjostrand et al. | |
| 8,190,294 B2 | 5/2012 | Sjostrand et al. | |
| 8,380,348 B2 | 2/2013 | Neki et al. | |
| 8,588,972 B2 | 11/2013 | Fung | |
| 8,639,644 B1 | 1/2014 | Hickman et al. | |
| 8,731,276 B2 | 5/2014 | Mizutani et al. | |
| 8,958,912 B2 | 2/2015 | Blumberg et al. | |
| 8,965,576 B2 | 2/2015 | Chen et al. | |
| 8,965,580 B2 | 2/2015 | Brooks et al. | |
| 2001/0028339 A1 | 10/2001 | Tani | |
| 2002/0050802 A1 | 5/2002 | Inoue et al. | |
| 2002/0082498 A1 | 6/2002 | Wendt et al. | |
| 2002/0164070 A1* | 11/2002 | Kuhner et al. | 382/159 |
| 2004/0172164 A1 | 9/2004 | Habibi et al. | |
| 2004/0172168 A1 | 9/2004 | Watanabe et al. | |
| 2005/0256611 A1* | 11/2005 | Pretlove et al. | 700/264 |
| 2006/0048364 A1 | 3/2006 | Zhang et al. | |
| 2006/0178775 A1 | 8/2006 | Zhang et al. | |
| 2007/0001638 A1 | 1/2007 | Gray et al. | |
| 2007/0061041 A1 | 3/2007 | Zweig | |
| 2007/0106421 A1 | 5/2007 | Kamrani et al. | |
| 2007/0276538 A1 | 11/2007 | Kjellsson et al. | |
| 2008/0028824 A1 | 2/2008 | Brogardh et al. | |
| 2008/0065257 A1 | 3/2008 | He et al. | |
| 2008/0091301 A1 | 4/2008 | Brantmark et al. | |
| 2008/0134801 A1 | 6/2008 | Tseng et al. | |
| 2008/0140321 A1 | 6/2008 | Blanc et al. | |
| 2008/0147239 A1 | 6/2008 | Chiang et al. | |
| 2008/0161829 A1 | 7/2008 | Kang | |
| 2008/0197710 A1 | 8/2008 | Kreitz et al. | |
| 2008/0302200 A1 | 12/2008 | Tobey | |
| 2009/0132088 A1 | 5/2009 | Taitler | |
| 2009/0204261 A1 | 8/2009 | Strand et al. | |
| 2009/0281659 A1 | 11/2009 | Wappling et al. | |
| 2009/0306825 A1* | 12/2009 | Li et al. | 700/261 |
| 2010/0036525 A1 | 2/2010 | Casanelles et al. | |
| 2010/0145509 A1 | 6/2010 | Zhang et al. | |
| 2010/0184011 A1* | 7/2010 | Comerford et al. | 434/321 |
| 2010/0188034 A1 | 7/2010 | Young et al. | |
| 2010/0236046 A1 | 9/2010 | Lundberg et al. | |
| 2010/0241248 A1 | 9/2010 | Zhang et al. | |
| 2010/0312391 A1 | 12/2010 | Choi et al. | |
| 2010/0312392 A1 | 12/2010 | Zimmermann | |
| 2011/0003640 A9 | 1/2011 | Ehrman | |
| 2011/0015787 A1 | 1/2011 | Tsukaka | |
| 2011/0046783 A1 | 2/2011 | Benchikh | |
| 2011/0095457 A1 | 4/2011 | Sirkett et al. | |
| 2011/0154934 A1 | 6/2011 | Skourup et al. | |
| 2011/0178638 A1 | 7/2011 | Tsukaka et al. | |
| 2011/0264266 A1 | 10/2011 | Kock | |
| 2012/0011956 A1 | 1/2012 | Lundberg | |
| 2012/0053728 A1 | 3/2012 | Theodorus et al. | |
| 2012/0059516 A1 | 3/2012 | Lundberg et al. | |
| 2012/0072023 A1 | 3/2012 | Ota | |
| 2012/0116584 A1 | 5/2012 | Kim et al. | |
| 2012/0130541 A1 | 5/2012 | Szalek | |
| 2013/0343640 A1 | 12/2013 | Buehler et al. | |
| 2013/0345863 A1 | 12/2013 | Linder et al. | |
| 2013/0345869 A1 | 12/2013 | Chen et al. | |
| 2013/0345870 A1 | 12/2013 | Buehler et al. | |
| 2013/0345872 A1 | 12/2013 | Brooks et al. | |
| 2013/0345873 A1 | 12/2013 | Blumberg et al. | |
| 2013/0345874 A1 | 12/2013 | Blumberg et al. | |
| 2013/0345875 A1 | 12/2013 | Brooks et al. | |

FOREIGN PATENT DOCUMENTS

| | | |
|---|---|---|
| EP | 2210716 A2 | 7/2010 |
| JP | 2008257353 A | 10/2008 |
| JP | 2011065652 A | 3/2011 |
| KR | 1020110109413 A | 10/2011 |
| WO | 98/02825 A2 | 1/1998 |
| WO | 01/37060 A1 | 5/2001 |
| WO | 03/045640 A1 | 6/2003 |
| WO | 2008/147239 A1 | 12/2008 |
| WO | 2009/018538 A2 | 2/2009 |
| WO | 2010/049101 A1 | 5/2010 |
| WO | WO-2010122445 A1 | 10/2010 |
| WO | 2258521 A1 | 12/2010 |
| WO | 2011/140704 A1 | 11/2011 |
| WO | WO-2011153156 A2 | 12/2011 |
| WO | WO-2012004017 A1 | 1/2012 |
| WO | WO-2012004232 A2 | 1/2012 |
| WO | WO-2012010332 A1 | 1/2012 |
| WO | 2012/020858 A1 | 2/2012 |
| WO | WO-2012027541 A2 | 3/2012 |
| WO | WO-2012031954 A1 | 3/2012 |
| WO | 2012/072023 A1 | 6/2012 |
| WO | 2012/116584 A1 | 9/2012 |
| WO | 2012/130541 A1 | 10/2012 |
| WO | 2013/192490 A2 | 12/2013 |
| WO | 2013/192492 A1 | 12/2013 |
| WO | 2013/192500 A2 | 12/2013 |
| WO | 2013/192500 A3 | 4/2014 |

OTHER PUBLICATIONS

PCT International Application No. PCT/US2013/046973, International Preliminary Report on Patentability mailed on Dec. 31, 2014, 17 pages.

PCT International Application No. PCT/US2013/046977, International Preliminary Report on Patentability mailed on Dec. 31, 2014, 17 pages.

PCT International Application No. PCT/US2013/046996, International Preliminary Report on Patentability mailed on Dec. 31, 2014, 19 pages.

U.S. Appl. No. 13/621,517, filed Sep. 17, 2012, by Linder et al.; Notice of Allowance mailed Nov. 19, 2014.

U.S. Appl. No. 13/621,519, filed Sep. 17, 2012, by Brooks et al.; Notice of Allowance mailed Dec. 16, 2014.

(56) References Cited

OTHER PUBLICATIONS

U.S. Appl. No. 13/621,561, filed Sep. 17, 2012, by Chen et al.; Notice of Allowance mailed Dec. 11, 2014.
U.S. Appl. No. 13/621,648, filed Sep. 17, 2012, by Buehler et al.; Final Office Action mailed Nov. 6, 2014.
U.S. Appl. No. 13/621,657, filed Sep. 17, 2012, by Blumberg et al.; Notice of Allowance mailed Dec. 22, 2014.
U.S. Appl. No. 13/621,658, filed Sep. 17, 2012, by Buehler et al.; Non-Final Office Action mailed Nov. 5, 2014.
U.S. Appl. No. 13/621,706, filed Sep. 17, 2012, by Blumberg et al.; Notice of Allowance mailed Dec. 3, 2014.
U.S. Appl. No. 13/621,708, filed Sep. 17, 2012, by Brooks et al.; Notice of Allowance mailed Dec. 22, 2014.
Witus G et al. "Learning to See: Research in Training a Robot Vision System," [DTIC] (Dec. 2008), available online at http://oai.dtic.mil/oai/oai?verb=getRecord&metadataPrefix=html&identifier=ADA499601 (last accessed on Jan. 17, 2013).
Thomaz A et al. "Learning about Objects with Human Teachers," [Socially Intelligent Machines Lab] (2009), available online at http://www.cc.gatech.edu/social-machines/projects.html (last accessed on Jan. 17, 2013).
Sjo K et al. "Object Localization using Bearing Only visual Detection," [Proceedings of the 10th International Conference on Intelligent Autonomous Systems (IAS-10)] (Jul. 2008), available online at http://www.csc.kth.se/~patric/publications/2008-IAS.html (last accessed on Jan. 17, 2013). (abstract only).
Nickel K et al. "Visual recognition of pointing gestures for human-robot interaction," [Image and Vision Computing] (2007), available online at http://www.sciencedirect.com/science/article/pii/S0262885606002897 (last accessed on Jan. 17, 2013) (abstract only).
Arsenic A.M. et al. "Developmental learning on a humanoid robot." [IEEE] (Jul. 25-29, 2004), available online at http://ieeexplore.ieee.org/xpl/freeabs_all.jsp?arnumber=1381182 (last accessed on Jan. 17, 2013) (abstract only).
Kulyukin V et al. "Human-Robot Interaction Through Gesture-Free Spoken Dialogue," [Kluwer Academic Publishers], (May 1, 2004), available online at http://www.springerlink.com/content/j4t5r86473605190/ (last accessed on Jan. 17, 2013) (abstract only).
Wai Ho L. et al. "Interactive Learning of visually symmetric objects," [IEEE] (Oct. 10-15, 2009), available online at http://ieeexplore.ieee.org/xpl/login.jsp?tp=&arnumber=5354616&url=http%3A%2F%2Fieeexplore.ieee.org%2Fiel5%2F5342790%2F5353884%2F05354616.pdf%3Farnumber%3D5354616 (last accessed on Jan. 17, 2013) (abstract only).
Feddema J.T. et al. "Model-based visual feedback control for a hand-eye coordinated robotic system," [IEEE] (Aug. 1992), available online at http://ieeexplore.ieee.org/xpl/login.jsp?tp=&arnumber=153279&url=http%3A%2F%2Fieeexplore.ieee.org%2Fxpls%2Fabs_all.jsp%3Farnumber%3D153279 (last accessed on Jan. 17, 2013) (abstract only).
Miura J et al. "Interactive Teaching of a Mobile Robot," [IEEE] (Apr. 18-22, 2005), available online at http://ieeexplore.ieee.org/xpl/freeabs_all.jsp?reload=true&arnumber=1570632 (last accessed on Jan. 17, 2013) (abstract only).
Wang Q et al. "Wavelet-based indoor Object Recognition through Human Interaction," [Proceedings of ICAR 2003, The 11th International Conference on Advanced Robotics] (Jun. 30 to Jul. 3, 2003, available online at http://www.google.co.in/url?sa=t&source=web&cd=12&ved=0CCAQFjABOAo&url=http%3A%2F%2Fciteseerx.ist.psu.edu%2Fviewdoc%2Fdownload%3Fdoi%3D10.1.1.59.6839%26rep%3Drep1%26type%3Dpdf&rct=j&q=Training%20robot%20to%20perform%20visual%20detection%20of%20objects%20w (last accessed on Jan. 17, 2013).
International Application Serial No. PCT/US2013/046973, International Search Report and Written Opinion mailed Feb. 5, 2014, 22 pages.
International Application Serial No. PCT/US2013/046977, International Search Report and Written Opinion mailed Oct. 31, 2013, 23 pages.
International Application Serial No. PCT/US2013/046995, International Search Report mailed Oct. 11, 2013, 3 pages.
International Application Serial No. PCT/US2013/046996, International Search Report and Written Opinion mailed Mar. 3, 2014, 24 pages.
International Application Serial No. PCT/US2013/046973, Invitation to Pay Additional Fees and Partial Search Report mailed Oct. 11, 2013, 5 pages.
"Robots Will Quickly Recognize and Respond to Human Gestures, With New Algorithms", Available Online at <http://www.sciencedaily.com/releases/2012/05/120524134525.htm>, May 24, 2012, 3 pages.
Azuma, Ronald T., "A Survey of Augmented Reality", In Presence: Teleoperators and Virtual Environments, vol. 6, No. 4, Aug. 1997, pp. 355-385.
Chen et al., "Gesture-Speech Based HMI for a Rehabilitation Robot", Proceedings of the IEEE Southeastcon '96, Bringing Together Education, Science and Technology, Apr. 11-14, 1996, pp. 29-36.
Kragic et al., "Real-Time Tracking Meets Online Grasp Planning", Proceedings of The 2001 IEEE International Conference on Robotics and Automation. Seoul, South Korea, May 21-26, 2001, pp. 2460-2465.
Belongie et al., "Shape Matching and Object Recognition Using Shape Contexts", IEEE Transactions on Pattern Analysis and Machine Intelligence, vol. 24, No. 4, Apr. 2002, pp. 509-522.
Iyer et al., "Shape-Based Searching for Product Lifecycle Applications", Computer-Aided Design, vol. 37, No. 13, Nov. 2005, pp. 1435-1446.

\* cited by examiner

VISION-GUIDED ROBOTS AND METHODS OF TRAINING THEM

CROSS-REFERENCE TO RELATED APPLICATION

The present invention claims priority to and the benefit of U.S. Provisional Application No. 61/662,646, filed on Jun. 21, 2012, and No. 61/676,586, filed on Jul. 27, 2012, the entire disclosures of which are hereby incorporated herein by reference. Reference is also made to U.S. patent application Ser. Nos. 13/621,517, 13/621,519, and 13/621,561), filed on even date herewith, the entire disclosures of which are likewise incorporated herein by reference.

TECHNICAL FIELD

The present invention relates, generally, to vision-guided robots and methods of training them. Various embodiments relate to intuitive interactions between the robot and the user that iteratively improve the robot's performance of tasks.

BACKGROUND

Industrial robots perform a variety of tasks involving the movement and manipulation of various objects. A typical industrial robot as used, e.g., in a manufacturing environment, may have one or more arms equipped with grippers that allow the robot to pick up, transport, and put down objects, and a machine-vision system that guides the robot in the performance of its tasks. Conventional machine-vision systems usually include custom-developed vision software with pre-defined descriptive visual models of the objects to be manipulated, which specify exactly what an object looks like and how it can be detected. Collectively, these pre-defined models often define a number of narrowly prescribed object classes that facilitate matching and identifying objects in the real world that belong to any of the classes, but are not, or only minimally, generalizable to new types of objects. Advanced robots, however, are generally intended to be used in a wide variety of situations, including situations involving objects that may not have been anticipated. The visual-recognition needs of such a robot cannot be adequately met with a set of pre-defined visual models; rather, the robot needs the capability to develop descriptive visual models for objects in the field as it encounters the objects. In addition, the robot may need to learn how to grasp, pick up, and/or otherwise manipulate the newly encountered object. Such learning may be facilitated by interactions with a human trainer who can provide the robot with information as the circumstances require. It is desirable, however, that the trainer is neither required to have knowledge of computer vision, nor burdened with algorithmic details and specifics of visual representations and models.

Accordingly, there is a need for robots with adaptable machine-vision systems that are capable of expanding the set of objects they can recognize and manipulate, either autonomously or with the help of intuitive interactions with a human trainer.

SUMMARY

The present invention provides, in various embodiments, methods for robot learning and robot training that involve two-way communication between a vision-guided robot and a human trainer. In training mode, the robot typically provides information about its internal state (as it relates to the performance of a particular task) in a manner intuitive to the trainer, e.g., using augmented-reality techniques. As used herein, "augmented reality" refers to real-world data (or the real world itself) augmented with computer-generated data. For example, the robot may use a camera to acquire images of its environment (constituting real-world data), and overlay computer graphics onto the image (such as, e.g., an object outline in the camera image, indicating selection of the outlined object by the robot, and/or a representation of the robot's end-effector, indicating the position of the end-effector relative to the object). Alternatively, the robot may project computer graphics into its environment, e.g., onto an object of interest. In response to such information from the robot, or of his own accord, the trainer provides input and/or feedback to the robot to alter the robot's state, e.g., by physically adjusting a robot arm or camera view, or by other such "natural" interaction, and/or via a traditional (e.g., graphical) user interface by entering text through a keyboard, selecting user-interface elements using a mouse, etc.

In general, robot-user interactions in accordance with various embodiments are structured in a way that does not involve hard-coding of instructions or specifications of technical details, but, instead, allows the user to provide information in terms of physical objects, task objectives, workspace properties, and other categories that a human would naturally know about. The trainer, thus, does not require special technical expertise to be able to train the robot. On the other hand, the training procedure is not so simplistic as to risk omitting details that are important for precise robot operation. To ensure that the robot acquires information sufficient for carrying out its tasks reliably and efficiently, the robot, in some embodiments, directs and manages interactions with the user so as to elicit all essential information, rather than relying solely on information volunteered by the trainer or perceivable in the environment. Thus, by virtue of the manner in which it has been programmed, the robot assumes responsibility for figuring out the details required by its algorithms, such as object boundaries, grasp trajectories, optimal camera angles, etc., and the user provides high-level direction (e.g., an indication of an overall training goal) and feedback as requested.

As part of the training process, the robot may repeatedly simulate performance of its task, each time adjusting its actions in executing the task based on user feedback. Training for the particular task is deemed completed when no further execution-altering feedback is received. In some embodiments, the trainer explicitly indicates his approval of the robot's performance (e.g., by pushing a dedicated button on the robot's body, clicking a check mark on the screen, or by any other means provided for), whereas, in other embodiments, trainer approval is inferred when a pre-determined time period has lapsed without further feedback. In yet another set of embodiments, the robot itself assesses its performance based on one or more internal, pre-programmed performance metrics or criteria and, once it meets the criteria, no longer accepts user feedback or registers the task as properly executable given the current state of information.

One example of a task that the robot may be trained to do is the selection and visual recognition of an object. In various embodiments, the user initiates the training, e.g., by pointing the robot's camera at an object of interest and pressing a "training" button. In response, the robot selects, among the objects in view, the one that the user is most likely interested in (e.g., by default, the object closest to the center) and communicates its selection, for example, by means of an outline overlaid onto the camera view. In alternative embodiments, the robot may initiate training by monitoring its environment and selecting an object in its field of view upon detection. Once the trainer has confirmed proper selection of the object, the robot attempts to learn a routine by which it can recognize that type of object in the future. In some embodiments, the learning process involves applying a number of different visual models, each including one or more vision algorithm and associated object representations, and selecting the visual model that works best for the object at hand. For example, some objects may be best recognized based on features extracted from the images (such as, e.g., parameters describing a certain shape), whereas others may be identified based on straightforward image correlation with a template image of the object. Which visual model is most suitable for the object may be determined based on user feedback and/or self-assessment of the robot. In addition to saving the selected visual model in memory for later use, the robot may also obtain non-visual information about the object and store it in association with the visual model. For example, if the robot's tasks involve picking up the object, it may need to know the weight of the object or a location in the environment where objects of that type are expected to be found. Such information may be entered directly by the user, or acquired through further training interactions.

Another example of a training goal is the proper grasping of an object by the robot. Rather than physically attempting to grasp the object, the robot may overlay virtual grippers onto a camera view of the object, and adjust the location of the virtual grippers based on input from the user, such as user-guided movement of the robot arm. When the virtual gripper appears to be in the proper position relative to the robot, the robot may try to grip and pick up the object with its physical gripper. If the attempt fails, the robot returns to the virtual-gripper adjustment step. Otherwise, relevant information about the accomplished task, e.g., the established grasp point and motions of the gripper and/or robot arm, may be stored along with the visual model of the object. When the robot later, in execution mode, detects an object of the same type, it may utilize the stored information to execute an object-specific pick-up routine. On the other hand, whenever the robot detects an object that it has not been trained to pick up, it may execute a generic, object-independent pick-up routine.

Accordingly, in a first aspect, the invention is directed to a robot-implemented method of learning to complete a specified task. In this method, the robot performs the task, visually displays the performance of the task in an augmented-reality display, receives performance-altering (e.g., mechanical or visual) feedback from a user, modifies the manner of performing the task in response to the feedback, and repeats the preceding steps until no further feedback is received (e.g., until the robot receives a signal indicative of user approval of the task performance, until a specified time period has elapsed without further performance-altering feedback, or until the robot determines, based on an internal success metric, that performance of the task is satisfactory).

Visually displaying the task in an augmented-reality display means that the robot overlays computer-generated graphics (in the broadest sense, i.e., including pictorial elements, text, etc.) onto the real-world, or a representation (such as a camera image) thereof. For example, the robot may overlay graphics onto a camera view captured by the robot, and display the resulting augmented-reality image on a monitor. However, the display need not utilize a dedicated screen or monitor, but may, for example, be projected onto a wall. Moreover, the visual augmented-reality display need not include a camera view at all, but may be created, for example, by a projection of computer-generated graphics onto the object itself.

In some embodiments, the task involves selecting an object in a camera view. In this case, the robot may visually display execution of the task by overlaying an object outline onto the camera view. The user-provided feedback may include an adjustment of the camera view; for example, if the camera is mounted to an appendage of the robot, the adjustment may be achieved via movement of the appendage. Alternatively, the object itself may be moved within the field of view.

In some embodiments, the task involves selecting a vision model from among a plurality of computer-implemented vision models, and identifying an object in a camera view based on a representation of the object in accordance with the model. Again, visually displaying performance of the task may involve overlaying an object outline onto the camera view. The robot may modify the manner of performing the task by selecting a different vision model.

In some embodiments, the task includes or consists of establishing a grasp point on an object visible in a camera view. Here, visually displaying task execution may include overlaying a visual representation of an end-effector onto the camera view at the grasp point. To provide feedback, the user may move the robot appendage, thereby causing a movement of the visual representation of the end-effector in the camera view.

In another aspect, the invention is directed to a vision-guided robot trainable, via interactions with a human trainer, to complete a specified task. The robot includes a machine-vision system with one or more cameras for capturing images within a camera field of view and an image-processing module for identifying objects within the captured images. Further, it includes a user interface including one or more output devices for presenting an augmented-reality display that visually displays performance of the task by the robot, and one or more input devices for receiving performance-altering feedback from the trainer. The output device(s) may be or include a monitor for displaying a camera view of the object and robot-generated graphics overlaid thereon, or a projector for projecting robot-generated graphics directly onto the object or elsewhere into the environment. The robot may include one or multiple appendages for manipulating objects; an such appendage(s) may simultaneously serve as input devices for receiving the user feedback. The robot also includes a control system for controlling performance of the task and modifying a manner of performance in response to the feedback until no further feedback is received. The image-processing module and the control system comprise sets of instructions stored in memory and executable by a processor. In some embodiments, the control system is configured to cause the user interface to display at least one training goal and to receive user feedback regarding the at least one training goal.

In another aspect, the invention is directed to a method of training a robot to complete a specified task comprising selection of an object; the robot includes a machine-vision system for capturing images within a camera field of view. The robot selects an object in the field of view, and displays the selection, in the form of a camera view of the selected object and a robot-generated object outline overlaid thereon, on a robot-controlled visual display. Based on the display, a user provides feedback to the robot indicating whether the selection is correct. These two steps may be repeated until the selection is correct.

In some embodiments, the robot's selection is based on mechanical and/or visual input provided by the user. For example, the robot appendage may be brought into physical contact with the object of interest so as to provide the mechanical input, or the object of interest may be brought into the camera field of view so as to provide the visual input. In some embodiments, the selection is based on a visual model and one or more associated object representations stored in memory. The object representation may include an image template, coordinates and texture descriptors associated with object keypoints, and/or parameters associated with an object shape.

Another aspect is directed to a vision-guided robot trainable, via interactions with a human trainer, to complete a specified task comprising selection of an object. The robot includes a machine-vision system, a user interface, and a control system. The machine vision system has one or more cameras for capturing images within a camera field of view and an image-processing module for identifying objects within the captured images. The user interface includes a robot-controlled visual display for displaying the images and, overlaid thereon, robot-generated graphics indicative of a selection of an object by the robot, and one or more input devices for receiving feedback from the trainer indicating whether the selection is correct. The control system modifies the selection of the object in response to the user feedback until the selection is correct. In some embodiments, the control system includes a data storage medium (e.g., system memory or a non-volatile storage medium such as, e.g., a hard drive) storing a plurality of visual models and associated object representations. Selection of the object by the control system may be based on an object representation associated with the object. The robot may further include one or more movable appendages for manipulating objects and receiving feedback from the trainer.

In a further aspect, the invention relates to a robot-implemented method of learning to visually recognize objects. The method includes establishing a visual outline of the object in a camera view thereof; based at least in part on an analysis of pixels within the outline, selecting a vision model from among a plurality of computer-implemented vision models and generating a representation of the object in accordance with the selected model; and, based on the model, identifying the object in a camera view thereof (which may be the same camera view as used to establish the visual outline, or a different one). Further, it includes receiving user feedback related to the identification (i.e., feedback either confirming or rejecting the identification), and repeating the visual-model selection, object-identification, and feedback steps until the identification is confirmed. The representation of the object may include, for example, parameters associated with a shape (e.g., an ellipse), coordinates and texture descriptors associated with keypoints, or an image template and associated similarity threshold.

Establishing the visual outline of the object may include identifying the object based on user input. The input may include or consists of, for example, movement of the object (by the user) within or into the field of view of the camera. In some embodiments, the robot establishes the visual outline of the object by displaying an outline in the camera view, receiving user feedback related to the outline (which the user may provide, e.g., by repositioning the camera that provides the camera view relative to the object), and adjusting the outline based on the feedback until the user confirms that the outline is proper. In some embodiments, the robot receives a visual outline drawn by the user on a drawing interface. The method may also include associating non-visual information with the object; such information may be solicited and received from the user. Further, the method may involve recognizing the object as a member of one of multiple object classes defined in memory.

Another aspect is directed to a vision-guided robot trainable, via interactions with a human trainer, to complete a specified task comprising visual recognition of an object. The robot includes a camera for capturing camera views of the object, and a control system for selecting a visual model from among a plurality of computer-implemented visual models based at least in part on an analysis of pixels within a visual outline of the object in a camera view thereof, generating a representation of the object in accordance with the selected model, and identifying the object in a camera view (e.g., the same camera view as used to select the visual model, or a different one) based on the model. Further, the robot includes a user interface having a robot-controlled visual display for displaying a camera view of the object and, overlaid thereon, robot-generated graphics indicative of the identification, and one or more input devices for receiving feedback from the trainer indicating whether the identification is correct. The control system may be further configured to modify the selection of the visual model based on the feedback. The robot may also include one or more movable appendages for manipulating objects and receiving feedback from the trainer.

In yet another aspect, a method of training a robot (with a machine-vision system for capturing images within a camera field of view) to complete a specified task comprising performing an action on an object is provided. In this method, the robot selects an object in the field of view and displays the selection (including the camera view of the selected object) on a robot-controlled visual display, overlays a representation of an end-effector onto the camera view, and displays performance of an action on the object by the end-effector. Based on the display, feedback is provided to the robot, indicating whether the action is performed correctly on the display. For example, the user may provide feedback by moving a robot appendage. The display of the robot's performance of the action on the object by the end-effector and feedback are repeated until the action is performed correctly on the display. If the end-effector is a gripper and the action includes gripping the object, the feedback may indicate whether the displayed grippers have gripped a proper part of the displayed object. In some embodiments, the robot selects the action from a plurality of stored action templates.

In a further aspect, a vision-guided robot trainable, via interactions with a human trainer, to complete a specified task comprising performing an action on an object is provided. The robot includes at least one movable appendage with an end-effector (e.g., a gripper) for performing the action on the object. Further, it includes a machine-vision system with one or more cameras for capturing images within a camera field of view and an image-processing module for identifying objects within the captured images, as well as a user interface and a control system. The user interface includes a robot-controlled visual display for visually displaying performance of the action on the object in a camera view thereof using a robot-generated graphic representation of the end-effector, and one or more input devices for receiving feedback from the trainer indicating whether the action is performed correctly on the display. The appendage may itself serve as such an input device. The control system is adapted to modify performance of the action on the display in response to the feedback until the action is performed correctly on the display. The control system may include a data storage medium for storing a plurality of action templates.

In another aspect, the invention is directed to a robot-implemented method of manipulating objects based on visual recognition thereof. The method includes causing a robot to execute the following steps: selecting an object in a camera field of view, using a visual model to computationally identify the object based on a stored representation thereof associated with the model, determining whether an object-specific manipulation routine is stored in association with the stored representation, and, if so, executing the object-specific manipulation routine, and if not, executing a generic manipulation routine.

In yet another aspect, the invention is directed to a vision-guided robot for manipulating objects based on visual recognition thereof. The robot includes one or more movable appendages for manipulating objects, a camera for capturing an image within a camera field of view, and a control system for computationally identifying an object in the image based on a representation thereof stored in association with a visual model, determining whether an object-specific manipulation routine is stored in association with the stored representation, and if so, causing the at least one movably appendage to execute the object-specific manipulation routine, and if not, causing the at least one movable appendage to execute a generic manipulation routine. The control system may also include a data storage medium storing a plurality of visual models and object representations associated therewith.

In yet another aspect, a vision-guided robot trainable via interactions with a human trainer is provided. The robot includes at least one movable appendage for manipulating objects, a machine-vision system comprising at least one camera for capturing images within a camera field of view and an image-processing module for identifying objects within the captured images, a visual display for displaying images, and a user interface module for (i) overlaying robot-generated graphics onto a displayed image, the robot-generated graphics being indicative of at least one of the identified object or performance of a manipulation task thereon, and (ii) receiving user feedback regarding the identified object or the performance of the manipulation task. The image-processing module and the user-interface module may include sets of instructions stored in memory and executable by a processor. The user interface module may be configured to display, on the visual display, at least one training goal and receive user feedback regarding the at least one training goal.

BRIEF DESCRIPTION OF THE DRAWINGS

The foregoing will be more readily understood from the following detailed description of the invention, in particular, when taken in conjunction with the drawings, in which.

DETAILED DESCRIPTION

1. Robot Systems

Robots in accordance with the present invention typically include one or more appendages with end-effectors for manipulating objects, input and output devices for perceiving the environment and interacting with users, and (as part of the robot itself or associated therewith as part of a robot system) a control system that controls operation of the appendages and end-effectors and information flow to the output devices based on the received input. The end-effector(s) can be easily moved around to any pose within a given workspace via direct physical interaction. The input devices include, most importantly for visual applications, a machine-vision (or, "computer-vision") system including one or more cameras (or other optical sensors) and associated image-processing hardware and/or software. In addition to visual input, the robot may also be able to process mechanical input as received through its appendages, joints or actuators, mechanical controls such as buttons, switches, and knobs, force or environmental sensors, etc. Further, the robot may receive information via traditional user input devices such as keyboard, mouse, or touch screen, which may be integrated into the robot or provided in a separate control facility in communication with the robot. The output devices generally serve to provide feedback to the user about the internal status of the robot, and include, in typical embodiments, a screen for displaying text, camera views, and/or computer-generated graphics (among other things). (Herein, "computer-generated graphics" and "robot-generated graphics" are used interchangeably.) Alternatively or additionally, the robot may include a projector for projecting computer graphics and other information into the environment, such as onto a wall or an object. The robot may also provide information to the user in the form of sound or haptic feedback.

Figure 1A:
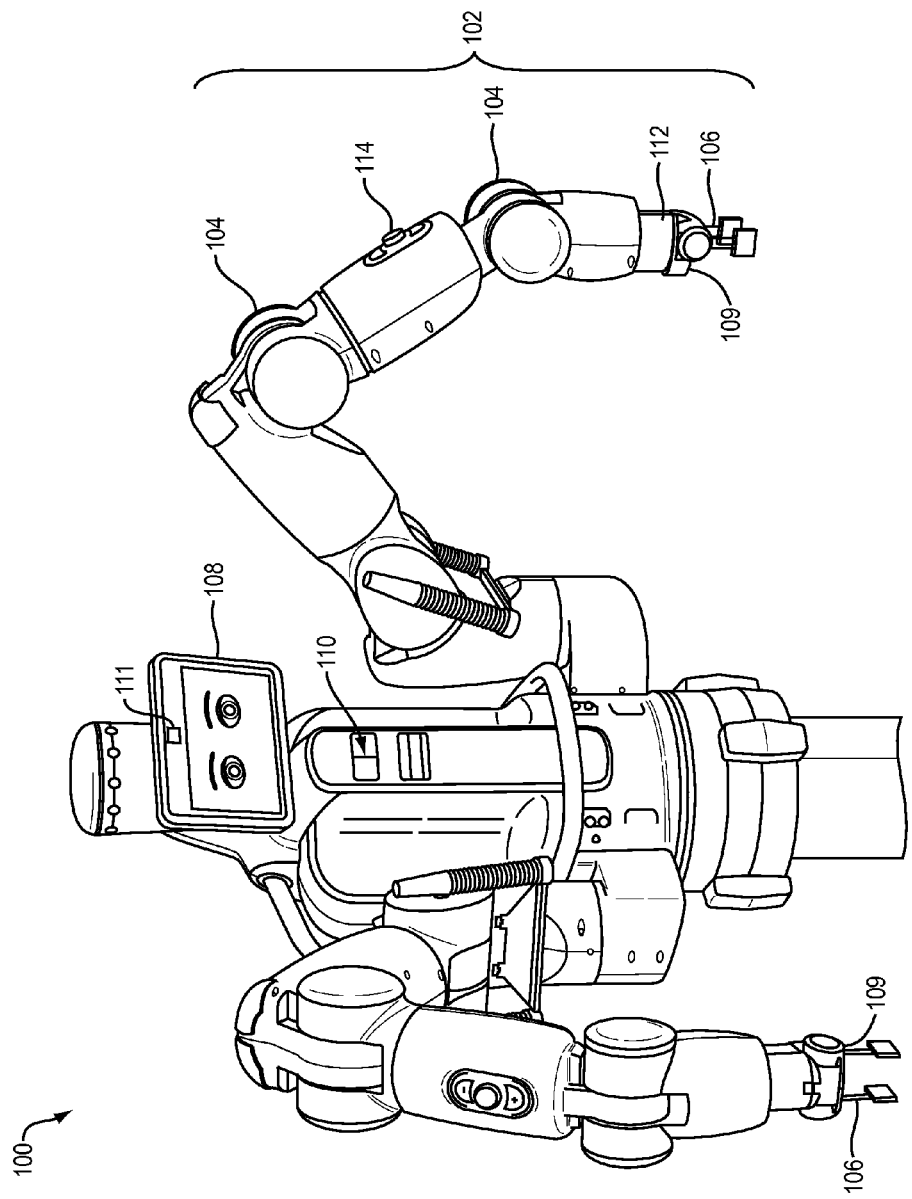
FIGS. 1A and 1B are perspective views of a robot in accordance with various embodiments.
Figure 1B:
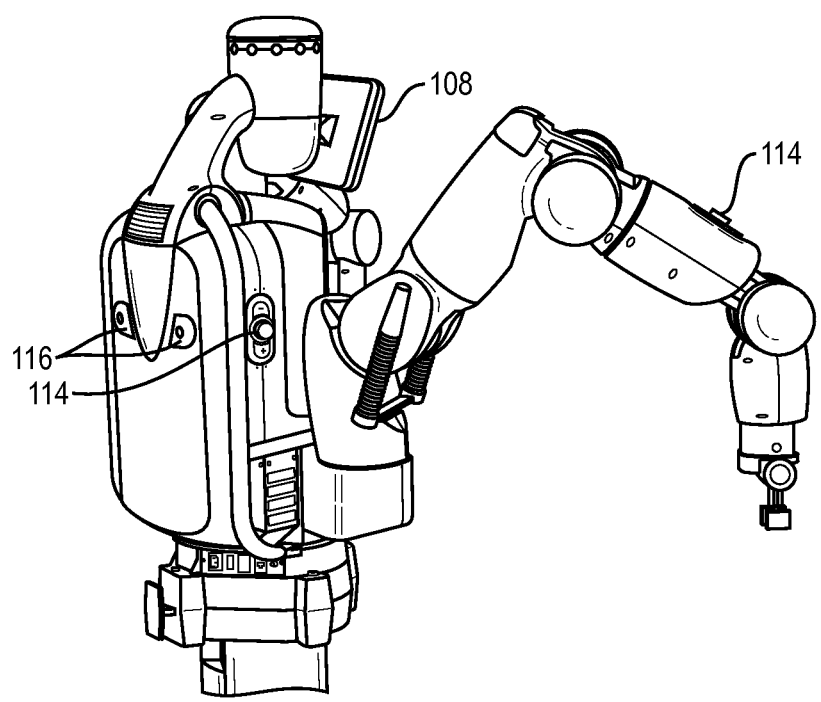

FIGS. 1A and 1B show a robot 100 in accordance with one exemplary embodiment. The robot 100 has two arms 102, each having seven degrees of freedom provided by suitable (and conventional) rotational joints 104. Each joint 104 desirably employs a series elastic actuator, enabling the robot to sense external forces applied to it, such as, e.g., forces resulting from unexpected collisions. Mounted at the end of each arm is a parallel-jaw gripper 106 that allows the robot to grasp, lift, and move objects. The robot 100 also has a head with a screen 108 and status lights, which serve to inform the user of the robot's state. The head and screen 108 can rotate about a vertical access, and nod about a horizontal axis running parallel to the screen 108.

Further, the robot 100 includes five cameras. It has one camera 109 in each of its two wrists so that the robot 100 can "see" objects it is about to pick up and adjust its grippers 106 accordingly. Further, it has two cameras 110, side by side, in its chest that provide a wide-angle view of the workspace and allow the robot 100 to visually detect equipment or objects to be manipulated. Finally, the robot 100 has a camera 111 above the screen 108 that is oriented outwardly to detect people in the environment. The robot 100 may also include range sensors in each wrist, and a ring of sonar sensors in its head that are used to detect moving objects in the environment; see co-pending application Ser. No. 13/456,915, filed on Apr. 26, 2012 and hereby incorporated by reference.

In addition to these sensors for visually and/or acoustically detecting objects, the robot 100 may include a number of touch-sensitive sensors and mechanical features on its arms 102 and body that facilitate mechanical interaction with a person (e.g., a trainer). For example, on each wrist, the robot has a cuff 112 that, whenever touched, switches the robot arm into a "zero-force gravity-compensated" mode that allows the user to easily move the arm from place to place for training purposes. In this mode, the robot arm acts like a set of links with low-friction bearings at each joint while gravity is compensated for so that the arm does not drop to the lowest possible configuration (but instead acts as if it were in outer space). On the wrist cuffs 112 are two buttons 114 that can be used in training the robot, for example, to map out areas by clicking one of the buttons at distinct points (e.g., the vertices of a polygon), to confirm correct visual selection of an object, or to manually cause the gripper to open or close.

Further, the robot 100 includes four identical sets 114 of knobs and buttons (each set collectively called a "navigator") on its arms, chest, and back. The navigators 114 allow the user to respond to information displayed on the screen 108 (e.g., by selecting menu items, switching between training and execution mode) and enter numbers (e.g., to indicate in how many rows and columns objects are to be packed in a box) or text (e.g., passwords or object and task names) via a digital rotary knob. The robot 100, moreover, includes two touch pads 116 on its shoulders, allowing a person coming up behind the robot 100 to tap the robot 100, thereby indicating on which side of the robot 100 he intends to stand when training the robot.

The robot 100 described above is, of course, only one of many possible robot embodiments in accordance with the invention, and the various features described above are representative rather than limiting. Various components and features can be modified in manners that will be readily apparent to persons of skill in the art. For example, the robot may, generally, have any number of arms (or, more generally, appendages), and each arm may have any number of degrees of freedom. The links of the arms need not be joined by rotational joints with one degree of freedom (such as, e.g., hinge joints), but may, for example, include ball-and-socket joints that provide two rotational degrees of freedom, or rail systems that facilitate translational motion. Further, instead of grippers with fingers that close around an object, the robot may include suction grippers or other means of holding an object. Alternatively or additionally, the robot may have other types of end-effectors, e.g., tools (such as a drill, saw, etc.) or measuring devices (such as e.g., scales, gauges, etc.). The robot may also include legs, wheels, or similar means of moving its body as a whole. Furthermore, additional and/or different types of sensors may be installed in various locations of the robot's body and appendages. Likewise, the screen 208 and status lights may be placed in different locations, or replaced with or supplemented by different components for communicating information to the user. For example, the robot may include a speaker and/or microphone for audio-communication.

Robot operation is governed by a control system, which typically includes a robot controller that monitors and alters robot positions, kinematics, dynamics, and forces; several joint-level controllers that drive individual motors and actuators to move the robot and/or its moving parts as directed by the robot controller; and high-level computational functionality that facilitates image-processing, user interaction, etc. The control system may generally be implemented in hardware, software, or a combination of both.

Figure 2:
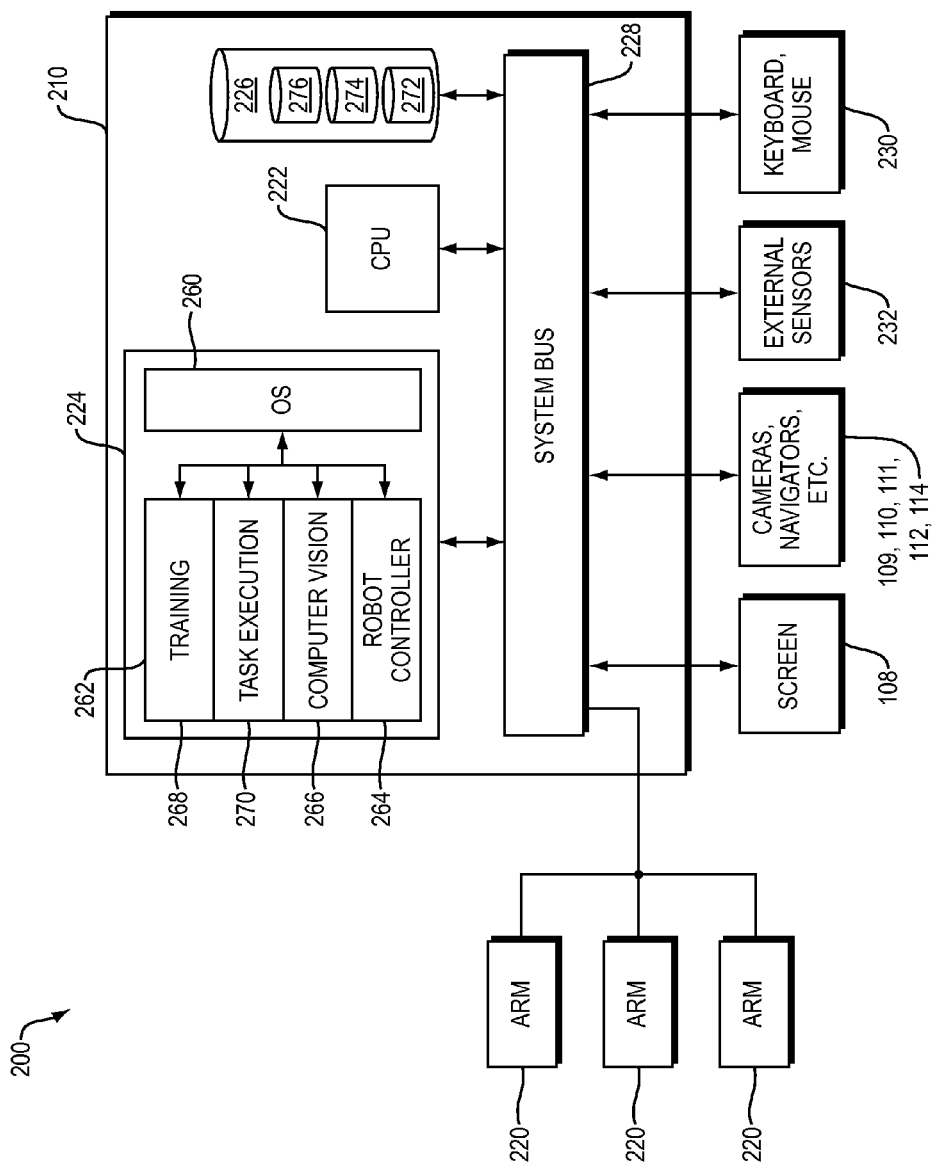
FIG. 2 is a block diagram illustrating an implementation of the computational and control functionality of a robot in accordance with various embodiments.

FIG. 2 illustrates an exemplary control system 200 in block-diagram form. In this system 200, the robot controller and high-level computational functionality are implemented on a general-purpose computer 210, whereas several ARM processors 220 (reduced instruction set computer (RISC) processors developed by ARM Holdings, Cambridge, UK) serve as the joint-level controllers. The general-purpose computer 210 includes a central processing unit (CPU) 222 (e.g., a quad-core Intel processor), system memory 224, and non-volatile mass storage devices (such as one or more hard disks and/or optical storage units) 226. The computer 210 further includes a bidirectional system bus 228 over which the CPU 222, memory 224, and storage devices 226 communicate with each other and with the ARM processors 220 as well as with internal or external input/output devices such as the screen 108, the cameras 109, 110, 111, navigators 114, wrist cuffs 112, traditional input devices 230 (e.g., a keyboard or a mouse), and external sensors 232.

The system memory 224 contains partitions and/or buffers to store, in digital (pixel) form, images obtained by the cameras, as well as portions of one or more databases for representing task and object representations as described below. Further, the system memory 224 contains instructions, conceptually illustrated as a group of modules, that control the operation of CPU 222 and its interaction with the other hardware components. An operating system 260 (e.g., Gentoo Linux) directs the execution of low-level, basic system functions such as memory allocation, file management and operation of mass storage devices 226. At a higher level, one or more service applications 262 implement the robot controller 264 and provide high-level computational functionality in one or more modules, e.g., as illustrated in a computer-vision module 266 (which, together with the camera(s), forms the machine-vision system), a training module 268, and a task-execution module 270. The modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages. The training and task-execution modules 266, 268 control the robot in two distinct modes of operation: training mode and execution mode, respectively. What distinguishes these two modes is that, in training mode, a user is present and engaged with the robot, teaching the robot how to perform certain tasks. By contrast, when the robot is in execution mode, it can generally not appeal to the user for help, and its primary focus is on executing a task specified in the training mode.

To facilitate the robot's autonomous performance of tasks in execution mode, the task-execution module 268 may utilize representations of tasks, and of objects to which the tasks pertain, that have been specified during training mode. In some embodiments, a two-tier data structure is used to create such representations. The first tier includes or consists of a library 272 of prototypes of tasks, objects, places, etc. that are programmed into the system 200 and stored in the storage devices 226. Each prototype includes one or more slots for parameters relevant to the task, object, or place it defines. Based on user input and information the robot receives about its environment during training, the training module 266 "instantiates" selected ones of these prototypes and populates their slots with parameter values, thereby creating instances that are stored in an instance database 274 on the storage devices 226 for later use by the task-execution module 268. (For example, the instance database 274 may be organized as a series of records each corresponding to a prototype, whose slots correspond to attributes in a conventional relational database architecture.) Thus, the task-execution module 268 and the training module 266 are tied together by, and interact through, the instance database 274, which constitutes the second tier of the data structures. The system may further utilize, as a third data structure, a library of user models 276 (or portions thereof) that include data relevant to ensuring that the training and task-execution modules 266, 268 interact with a person appropriately (which may include, for example, identifying whether a particular person is an authorized user and imposing safety constraints on movement when any person enters the robot's operating zone). Of course, the prototype library 272, instance database 274, and user models 276 may, during operation, be loaded into system memory 224. Further detail about the function of the training and task-execution modules 266, 268 and their interplay with the two-tiered data structure of prototypes and instances can be found in a co-pending patent application entitled, "Training and Operating Industrial Robots," filed on even date herewith and incorporated herein by reference.

The control system 200 and its various components may be integrated into the robot, or kept (at least in part) in a separate control facility in communication with the robot. For example, in some embodiments, general-purpose computer 210 is located remotely from the robot and communicates with the robot via, e.g., Bluetooth, WLAN, an 802.11 protocol, an Ethernet network, or any other wired or wireless connection. Alternatively, if the size of the robot allows, the computer 210 may be built into the robot. Further, it is to be understood that the organization and function of the computational modules and data structures described above with reference to FIG. 2 is only one example of an implementation of control functionality for robots in accordance with the present invention. While the specifics of the control system 200 as described above may be beneficial for implementing robot training methods according to various embodiments hereof, they are generally not necessary. Rather, various alternative suitable control system architectures—which may share some of the features of system 200—will be readily apparent to persons of skill in the art. For example, the instructions of the various software-implemented system components may be grouped into one or more modules whose functions and interactions may be different from those described above.

Further, instead of using a general-purpose computer, the control system may employ any of a variety of other processing devices, including, without limitation, special-purpose computers, microcontrollers, application-specific integrated circuits (ASICs), field-programmable gate arrays (FPGAs), digital signal processors (DSPs), or programmable gate arrays (PGAs). Such devices may, likewise, be mounted in or on the body, head, or appendages of the robot, or contained in a separate control facility that communicates with the robot via cables or wireless signals. In various embodiments, combinations of multiple different processing devices are used. Furthermore, in some embodiments, the overall control functionality is distributed between components physically integrated into the robot, and external components in communication with the robot. For example, the robot controller and joint-level controllers, as well as hardware for acquiring camera images or other signals (and, possibly, performing basic image/signal processing steps) may be located in the robot, whereas high-level data structures and processing functionality may be provided in a remotely located facility.

2. Robot-User Interactions

Various embodiments of training methods in accordance herewith allow the user to interact with the robot in a manner that is intuitive to her. Such interaction generally involves intuitive two-way communication. For example, to convey information about its internal state and demonstrate performance of a task to the user, the robot may employ various augmented-reality techniques—i.e., augment the real world, or a representation thereof, with computer-generated data that are easily related to the real world—rather than displaying highly technical data that only a technically sophisticated user could decipher. Conversely, to instruct the robot which tasks to perform and how to perform them, the user may guide the robot mechanically or visually, rather than programming the robot in the traditional sense, which would require significant time and a high level of technical expertise.

Robot-user interaction generally takes place via various of the robot's hardware components, such as its input and output devices and appendage(s), and is controlled and processed by associated program code, as may be contained, e.g., in the training module 266 or a separate interaction module. Some of the hardware components, such as the robot's wrist cuffs, navigators, and screen, are specially dedicated to user interaction, whereas others, such as cameras and appendages, have separate, independent functions (e.g., to capture images of an object or manipulate the object), but double as user-input devices (e.g., by interpreting visual information such as hand gestures or user-manipulation of the appendage as user input). Collectively, these hardware and software components are hereinafter referred to as the "user interface."

In some embodiments, the robot utilizes visual augmented-reality techniques that involve presenting information in the form of computer-generated graphics (sometimes supplemented by text) overlaid onto a display of one or more camera views captured by the robot. (Such graphics may be generated by standard program routines implemented, e.g., in the training or interaction module, or integrated into the robot's computer vision module.) For example, the robot may show an image (or video, i.e., image stream) of its environment, and indicate selection of an object in the field of view by drawing an outline of the object in the image. As another example, if the robot's task involves visually measuring an object, the robot may overlay the computed dimensions onto the image. In either case, the user may have the opportunity to provide feedback by manipulating the computer-generated graphics. For example, if the object outline does not encompass the entire object or, conversely, includes areas not corresponding to the object, the user may drag vertices of the outline to a desired position to achieve better correspondence. Such user input may be provided, e.g., with a mouse or via a touch screen. The camera view is typically displayed on a screen or monitor integrated or connected with the robot. However, in alternative embodiments, the image may be projected onto an external screen, which may be a wall, an object surface, etc. Further, visual augmented reality need not necessarily use camera images. Instead, the robot may place optical signals into the real world itself. For example, to communicate its object selection to the user, the robot may simply shine a laser pointer at the object.

Augmented reality is, of course, not limited to visual information. Sounds, haptic feedback, and/or even odors may likewise be added to the natural world as it exists. For example, when a trainer moves the robot's arm to an object of interest, she may, in some embodiments, feel the robot arm "lock on" to the object once the robot has correctly identified the object. Other haptic feedback may include, for example, intuitive haptic "signatures" associated with certain objects or places, such as, for example, a scratching sensation when the robot's end-effector is positioned above a conveyor belt or a series of clicks indicating the frequency with which objects on the conveyor belt pass underneath the end-effector. Further, when the user moves the robot and/or its appendages in a manner that risks collision of one part of the robot with another, the robot may generate resistive forces that not only prevent the collision, but also signal to the user, via implicit haptic feedback, that she is doing something wrong. As an example of the use of sound, the robot may employ an audible counter, e.g., akin to a Geiger counter or metal detector, to indicate in a continuous manner how close the orientation of its arm is to a targeted final orientation (or to a dangerous position).

In various embodiments, training is centered around tasks, objects, places, etc. as they pertain to a particular training goal. Typically, the training begins by selecting the training goal or subgoal from a collection of goals hard-coded into the training module. For example, the user may select a training goal from a comprehensive list, or the robot may suggest one or more training goals based on sensory input and its stored prototypes. When detecting an object in a camera view, for instance, the robot may ask the user whether it should learn a visual-recognition technique or a method of grasping the object. Once the user and the robot agree on the goal, the robot solicits information necessary to achieve the goal from the user. In embodiments that utilize a two-tier data structure as described above, the robot instantiates prototypes related to the task objective. Assuming, for example, that the task is to grasp and pick up an object, the robot may instantiate a "pick-up" prototype and an associated object prototype. The pick-up instance may require the user to specify which object is to be picked up, where the object is located in the workspace, and where it needs to be grasped—information that the user naturally knows. The user may volunteer the required information, or provide it in response to specific requests from the robot. In either case, the user may provide the information in a way that is intuitive to him, e.g., by pointing at the object and orienting the robot's end-effector in a way suitable for grasping it. The robot then interprets and translates the user input into more precise data, soliciting user feedback along the way as needed. For example, having identified the outlines of an object the user pointed at, the robot may ask the user to confirm, or correct, the selection. Thus, once the user has given high-level direction about the training goal, the robot, rather than the user, may guide and direct the interaction.

In many cases, the robot simply simulates what it would do in execution mode (e.g., select an object), and augments the simulation with intuitive information (e.g., an outline of the object) that helps the user assess the robot's performance (e.g., decide whether the selection is correct) and provide feedback to alter task-execution if appropriate (e.g., adjust the outline). This process may be repeated to iteratively improve the robot's performance, and may continue until performance is satisfactory. In some embodiments, the robot deems its performance satisfactory if it does not receive any execution-altering feedback for a specified period of time. In other embodiments, the robot awaits explicit approval from the user or, alternatively, determines itself, based on one or more performance metrics, whether it successfully completed the task. The robot may also indicate to the user that it deems its performance satisfactory, and request confirmation from the user.

3. Training Procedures

Figure 3:
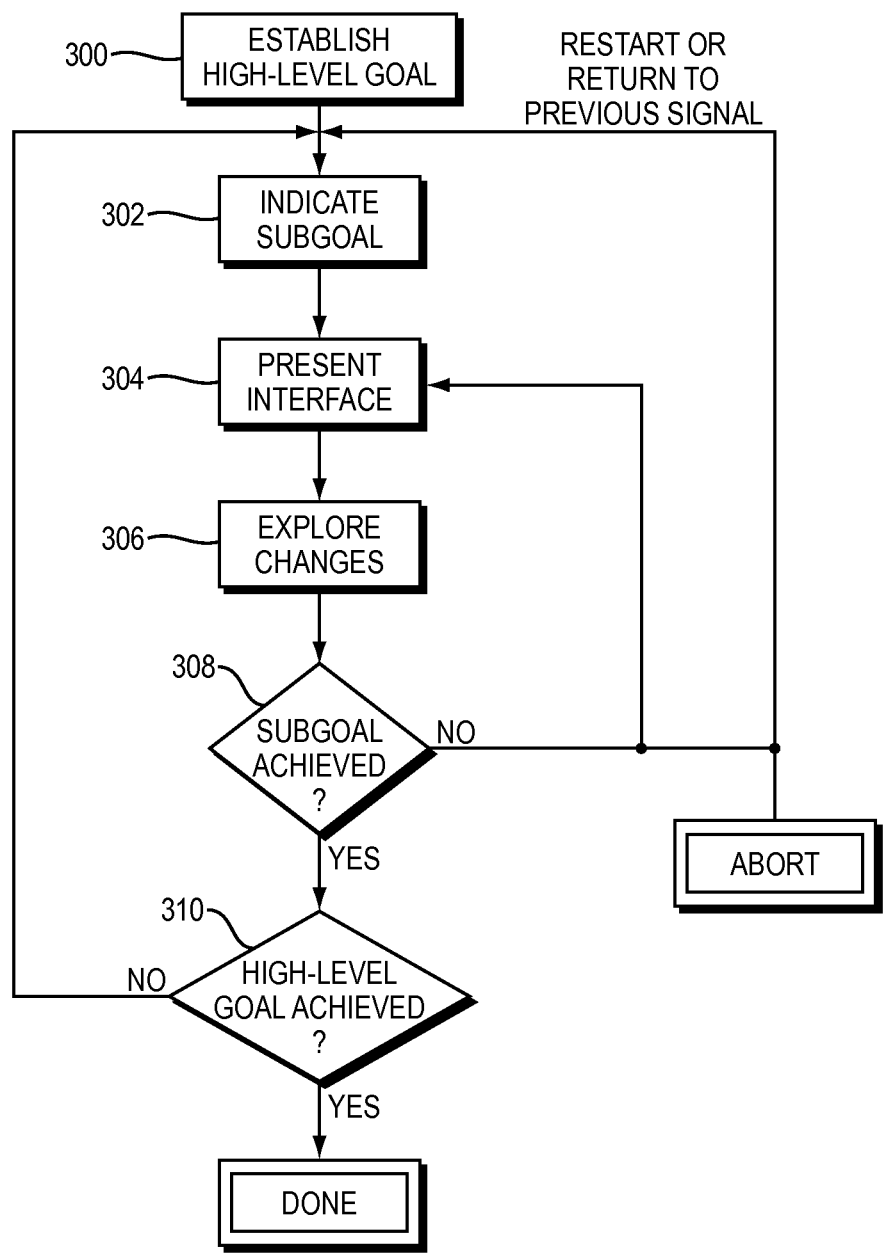
FIG. 3 is a flow chart illustrating a method for selecting and achieving training goals and subgoals in accordance with various embodiments.

In various embodiments, robot training evolves around training objectives that are known to both the robot and the user. FIG. 3 illustrates, at a high level, an exemplary process of establishing and achieving such objectives; many steps of this process can be performed by the robot, by the human trainer, or jointly by both. In a first step 300, a high-level goal is agreed upon between the robot and the user. For example, the user may be presented with a list of goals that he can scroll through to pick one. Alternatively, the robot may suggest a goal that makes sense in the context of the current training procedure. For instance, if the user previously indicated a location in the workspace where things can be picked up, the robot may suggest learning the types of objects it should look for in that location. The suggestion may take the form of a yes/no question presented, e.g., on the robot's display or via speech.

Based on the high-level goal, the robot may, in step 302, indicate a subgoal to the user, or vice versa. For example, if the goal is to learn enough information about an object to pick it up, the robot may inform the user that it needs input to determine which object to pick up. It may do so, for instance, by presenting text on a visual display or by speaking to the user via a speaker. In many cases, the high-level goal has an associated set of requisite subgoals. Sometimes, the subgoals need to be achieved in a particular order (which may be specified, e.g., in a prototype associated with the high-level goal); in this situation, the robot may automatically establish a new subgoal when the previous one was achieved. Further, a high-level goal may have optional subgoals associated with it. For example, during a procedure for teaching the robot to recognize an object, the user may decide to input auxiliary information about the object that the robot cannot obtain through its sensing system. Similarly, the robot may present, as a subgoal, a request to the user to supplement sensing deficiencies. For example, if the trainer indicates that an object can be found on a conveyor belt, the robot may initiate the subgoal of establishing the speed of that conveyor belt. It may then attempt to achieve this subgoal using visual input about the conveyor belt, or simply request that the user enter the information.

Next, in step 304, the robot presents an interactive interface that allows the user and the robot to work together toward the subgoal. The interface generally includes an intuitive (e.g., augmented-reality) presentation of the robot's internal state as it relates to the robot's ability to achieve the subgoal, as well as means for the user to explore changes to this internal state (in step 306), preferably through natural interactions. For example, the robot may indicate to the user that he can move the robot's camera around to help identify the object of interest. Further, it may present its hypothesis (i.e., internal state) as to where the object of interest is to the user, e.g., by providing a live camera view along with an overlaid outline of the putative object. Alternatively or additionally, the robot may provide haptic feedback to guide the user towards the center of the hypothesized object. The user may then either provide positive feedback by moving the robot arm towards this center, or resist the robot's forces to cause the robot to explore other hypotheses. Alternatively or in addition to augmented reality and natural interactions, more traditional methods for providing feedback, e.g., via text output and input, may be used. Further, the interface need not necessarily facilitate free interactions at any stage, but may structure user-robot interactions as a step-by-step process.

The robot generally adapts its internal state, which is defined by the entirety of the robot's information regarding the task at hand (e.g., the parameter values of all instantiated prototypes related to the task), and the manner in which it executes the task based not only on immediate user feedback, but also on knowledge of the current stage within the overall training procedure, on experience of user reaction during previous subgoals, as well as on internal measures of the success of the learning method. Using this information, the robot may, in certain circumstances, determine that it is not worthwhile to continue with the learning procedure. At this point, the robot may ask the user to decide whether he wishes to abort, return to a particular preceding step (e.g., to improve performance of executing the preceding step), or restart the entire training procedure for the high-level goal. Similarly, the user may determine, based on his interactions with the robot, that the subgoal cannot be achieved at the time.

Typically, however, the interactive exploration of robot states (i.e., steps 304 and 306) continues in a loop until the subgoal is achieved, as determined by the robot, the user, or both in a decision step 308. To illustrate, the subgoal of identifying the object of interest may be deemed achieved once the user has acknowledged (e.g., by pressing a button) that the robot has outlined the correct object in the visual display. The training process then generally returns to the subgoal-selection step 302 in order to move on to the next subgoal relevant to achieving the high-level goal. Further subgoals relevant to, for example, picking up an object may include choosing a visual model to represent the object, establishing a grasp point, and testing whether the acquired information about the object is sufficient to pick it up. In prototype/instance implementations, these subgoals generally correspond to subtasks that define a task prototype. Whenever a subgoal has been achieved (as determined in decision step 308), the robot and/or user determine, in a second decision step 310, whether any subgoals are outstanding. Once the last subgoal relevant to the high-level goal (i.e., task) has been achieved, the training process is complete.

Figure 4:
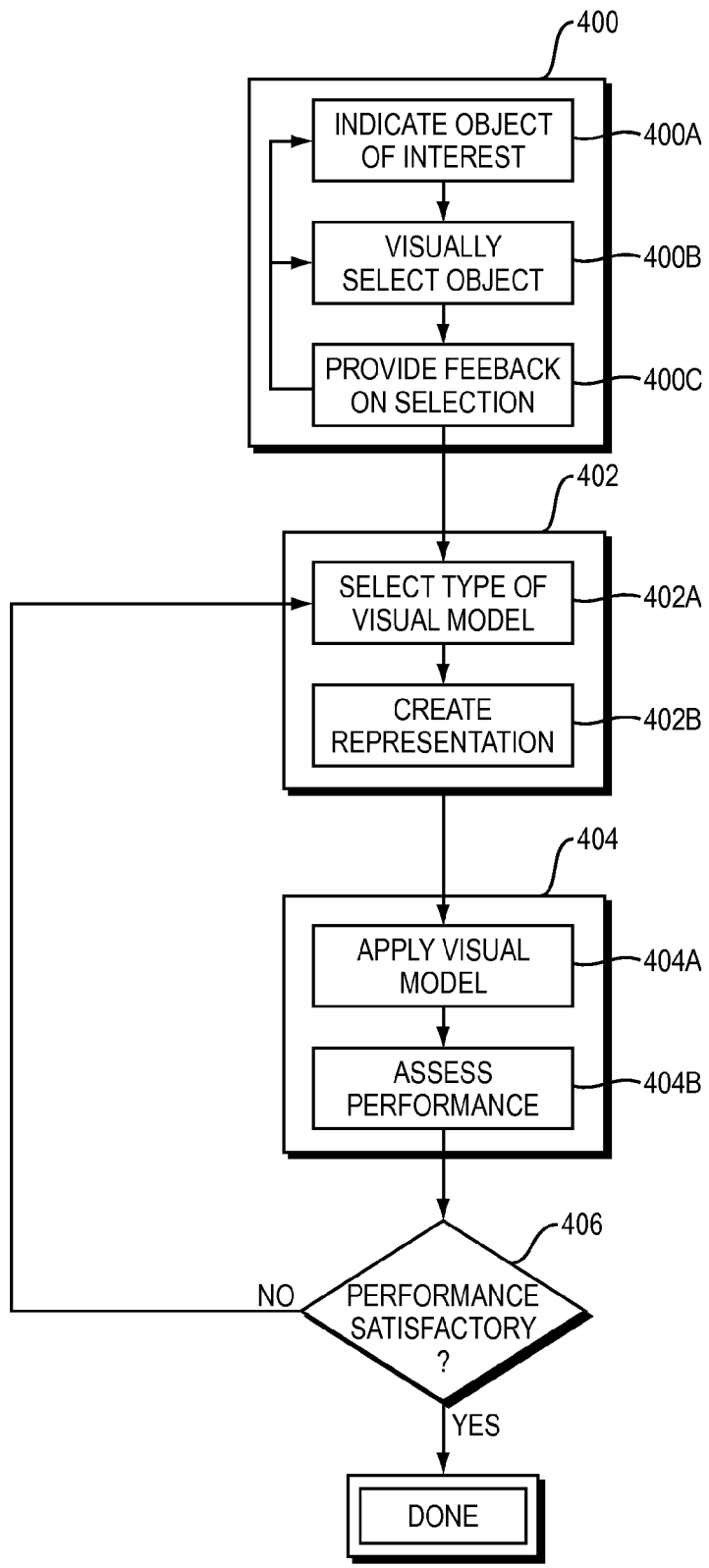
FIG. 4 is a flow chart illustrating a training method for visual object recognition in accordance with various embodiments.

FIG. 4 illustrates an exemplary training procedure for a specific training objective: visually identifying an object. In a first step 400, an object is selected in one of various possible ways. In some embodiments, object selection is itself an iterative, interactive process. Following an initial indication of the object of interest by the user (step 400A), the robot may attempt to select the object based on the user's indication (step 400B), and the user may then provide feedback to confirm or correct the selection (step 400C). For example, in one embodiment, the user pushes a dedicated button to start training mode, and adjusts the robot's camera such that the object appears at or near the center of the camera's field of view. The robot may identify and circumscribe the object of interest using foreground/background segmentation techniques based on color, texture, edges, or a combination thereof (e.g., as implemented in various widely available, open-source tools). If the robot has depth-sensing capabilities, depth information may likewise be used. In another embodiment, the user may, within the camera field of view, point at the object or move his arm in a way indicating the object. As in the preceding example, the robot analyzes captured images of the scene using segmentation techniques; however, here, the segmentation changes as the user moves his arm, providing additional information to the robot. In yet another embodiment, the user may move the object of interest into the camera field of view. The robot may then use background subtraction between an initial image and an image acquired after the object has been moved to identify the object. Similarly, the user may nudge or shift the object within the camera field of view, allowing the robot to select the object based on change detection or motion segmentation. The user may also indicate the object of interest simply by pointing at it with his finger or by shining a laser onto the object. In various embodiments, the user and/or the robot may choose between multiple methods for indicating the object, and communicate the selection to each other. For example, the robot may request, e.g., via text output, that the user indicate the object of interest in a particular manner, or the user may select the method she intends to use from a list of available methods.

To communicate its object selection, the robot may present an object outline overlaid onto the camera view. (As used herein, the term "outline" refers to any graphical representation that indicates the object boundaries, such as, e.g., a contour or highlighting of the entire object area.) Based on the outline, the user may confirm the selection of the object, or provide feedback to correct it if necessary. Correct selection may be indicated, for example, by pushing a dedicated button on the robot's body, clicking a check mark on the screen, or using a voice command. To alter the robot's object selection, the user may, for example, adjust his original indication of the object of interest (e.g., by moving the object closer to the center), switch to another method if indicating the object, control the selection by adjusting an (physical or graphical) slider or knob, manually select the object in the image (e.g., by touching it on a touch screen), manipulate the robot-generated outline, or speak to the robot if it is equipped with an audio feed and language-processing capability. In some embodiments, rather than letting the robot select the object based on initial user input in the real world, the user directly outlines the object in a drawing interface overlaid onto the camera view, e.g., by tracing its contours with a cursor or moving the cursor across the pixels that correspond to the object. As an alternative to traditional input methods, the robot's camera may serve as a painting device, e.g., using the center of its viewing window to follow the object contours. In some embodiments, a user-generated outline is used as an approximation that is further refined by the robot (e.g., based on segmentation) in conjunction with user feedback. Further, in certain embodiments, the robot presents its selection not on a screen, but by projecting graphics directly onto the object of interest using a conventional graphics-projection output component. Instead of using computer-generated graphics, the robot may also demonstrate it selection through some physical action, e.g., by moving its end-effector above the object.

In various embodiments, haptic feedback is used to aid in the object-selection step. For example, to initially indicate the object of interest, the user may bring the robot's end-effector into physical contact with the object. The robot may then move away from the object to get a better view, and use the visual methods described above in conjunction with knowledge of the approximate location of the object to select the object in the view. Further, in addition or alternatively to displaying its selection on the screen, the robot may signal the user haptically where it believes the object to be, e.g., by simulating attractive forces that pull the robot arm or end-effector, and with it the user's hand holding on to the arm, towards the object. Conversely, if the selection is wrong, the user may inform the robot so by pulling the end-effector towards the true object of interest. The various object-indication and -selection techniques described above are not to be considered exclusive, but exemplary only; additional visual, haptic, or other techniques may be available to the robot and user to indicate, select, and agree upon an object. Further, whichever approach is used, the trainer usually has the option of aborting the process if the robot fails to indicate the correct object.

Returning to FIG. 4, once the robot and user have established the object of interest (step 400), the robot may, in step 402, select and/or create a visual model for the object that allows it to detect, recognize, and localize the same object or an object of similar visual appearance in the future. A visual model, as the term is used herein, includes a data structure representing the object (i.e., a "representation"), as well as associated algorithms that facilitate creating the representation during a learning process and applying the representation to identify the object during a detection step. The representations and associated algorithms, or pointers thereto, may be stored in instances of the respective objects.

Figure 5:
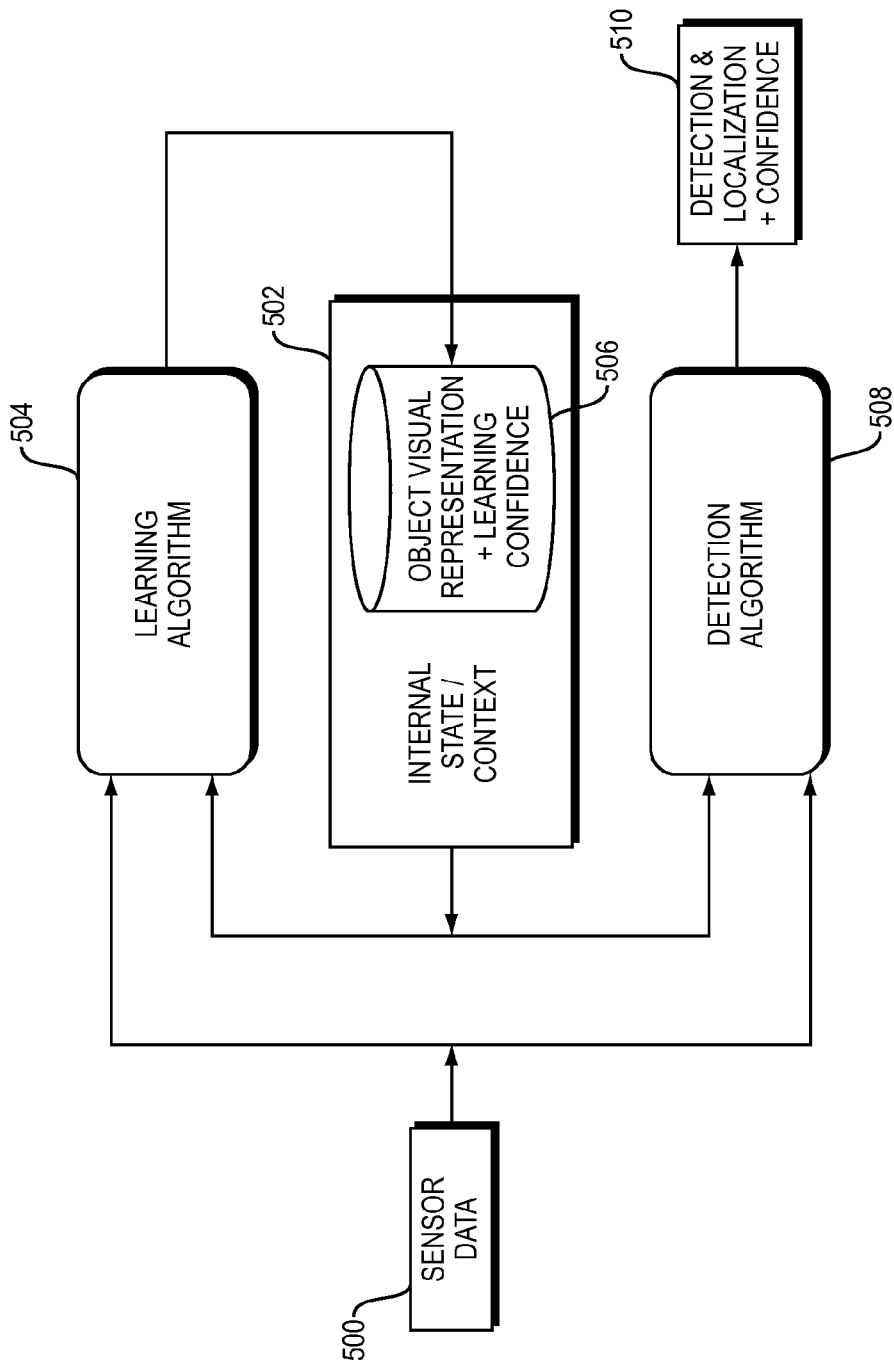
FIG. 5 is a diagram conceptually illustrating the operation of visual models.

FIG. 5 illustrates the relations between the object representation, the associated learning and detection algorithms (which operate as described above and below, and which are executed by the CPU 222 shown in FIG. 2), and the type of input required for each. Generally, the robot has two types of information available: sensor input 500 about the current state of its environment as well as of the physical state of the robot itself, and contextual knowledge 502 from previously achieved subgoals. Sensor input 500 includes, typically, a video stream of images from one or more robot cameras, e.g., from a camera integrated into an end-effector and pointing at the object of interest, and three-dimensional positional information about the location (and/or orientation) of the camera in a fixed coordinate system associated with the robot. The contextual information 502 relevant to object recognition includes a previously acquired image or video stream annotated with labeled pixels (e.g., contour outlines, highlights, etc.) that indicate which pixels belong to the object and which do not.

Upon selection of a visual-model type or class, the learning algorithm 504 extracts a representation 506 from the annotated image(s) of the object (i.e., from contextual data), i.e., it creates a data structure capturing certain visual characteristics of the object. Live sensor data 500 may be used to tune or verify the training process. This representation 506 becomes part of the robot's contextual knowledge 502, and serves, at a later time, as input for the detection algorithm 508. The detection algorithm 508 uses the representation 506 in conjunction with real-time sensor input 500 to identify and localize objects that visually match the representation 506. Its output 510 may, for example, take the form of a Boolean parameter indicating whether the object can be seen in the real-time image, along with real values for a set of parameters indicating the position, size, and/or orientation of the object in a coordinate space associate with the image (e.g., center coordinates x and y, a scaling factors indicative of size, and an angle θ indicating the orientation of a selected object axis with respect to a coordinate axis).

To further illustrate the use of visual models for object recognition, three exemplary visual-model classes are now described. In the first type of visual model, the object is represented with a two-dimensional shape, such as an ellipse. In this case, the learning algorithm 504 extracts, from a given annotated image, a boundary of the labeled object. Next, it fits an ellipse to the boundary (treating the boundary pixels as points sampled from the ellipse) to determine ellipse parameters. The shape of an ellipse can be fully described with three parameters, e.g., the orientation and the lengths of major and minor axes. The parameter values may be determined using a least-squares method, or any other suitable regression approach. The learning algorithm may also provide an error metric or confidence metric that indicate how closely the object can be fitted with an ellipse. In general, if the error exceeds a specified threshold, the representation is deemed invalid. The detection algorithm 508 processes an image to perform conventional edge detection (e.g., based on contrast), identifies line segments and arcs in the edge, and then attempts to fit an ellipse to these segments. If the parameters thus determined are within specified ranges around the parameters of the representation, a match is declared. (Typically, the match is determined based on shape only—not considering size—as the size of an object within the image varies with the distance from the camera.) The edges may then be analyzed further to determine the position, orientation, and size of the ellipse.

A second approach represents the visual appearance of objects with a database of keypoints and associated texture descriptors. A "keypoint" is an object feature characterized by its position, orientation, and scale in the image; the associated "texture descriptor" summarizes image gradients at the keypoint position, normalized for scale and orientation. The learning algorithm 504 extracts features from the image of the object and stores the corresponding keypoint and descriptor data in a feature database. The detection algorithm 508, similarly, extracts the keypoints and descriptors of features from a given input image, and compares them against the feature database constituting the representation. If some features appear to match, the detection algorithm attempts to find a geometrically consistent transformation between the two sets of features, and if such a transformation is found, it saves the transformation and the matching features. Further, it provides, as output, a center point of the matching features in the new image, along with information about scale and orientation.

In a third class of visual models, an image of the object itself, or multiple images of the object (e.g., taken from different perspectives), serve as the representation, along with an image-similarity threshold. From one or more annotated camera views identifying the object of interest, the learning algorithm 504 extracts one or more respective image templates of the object by tightly cropping around the object outline. A similarity threshold for each template can be determined using conventional cross-validation techniques which exercise the detection algorithm on training data. The training data can be the original data given to the learning algorithm, newly acquired training images of the object, or modified versions of training images that simulate noise or other expected image transformations. The detection algorithm 508 compares real-time camera images against the template and determines, based on a similarity metric, whether the real-time image contains the object of interest. For example, the detection algorithm may run a normalized cross-correlation of the stored image template with a presently acquired image, resulting in a score for reach pixel. Scores above a set threshold (e.g., the threshold determined by the learning algorithm based on anticipated noise levels etc.), may then be clustered to determine the potential location of the object in the image. To account for variations in scales (e.g., object sizes in the image) and orientation, the detection algorithm can be explicitly applied to rotated and scaled versions of the input image. Alternatively, the template images can be rotated and scaled while keeping the input image unchanged.

The ellipse-detection approach is based on the shape of the object, while the template-matching approach is based on the appearance of the object (i.e., the pixel values of the object's image) without using visual abstractions. The keypoint-descriptor approach combines elements of both; it captures shape through geometric relationships among multiple keypoints, and appearance through the texture-based descriptors. It is to be understood that the three visual models describe herein are merely examples; many other types of representations and associated algorithms may be used to detect and identify objects in accordance with embodiments of the invention. Typically, a certain type of visual model is applicable to a wide variety of objects. For example, the "ellipse-detector," as it is commonly called, is a vision approach that can learn and detect almost any object that has a predominantly elliptical (or circular) shape; and template matching can be used with any kind of object. Further, a particular object can generally be recognized using any of several visual models (e.g., both a template-based and a shape-based model). However, different approaches often perform quite differently on the same objects. In these cases, it is beneficial to select the most suitable vision approach for the object at hand.

In various embodiments, the robot automatically chooses a visual-model class that provides reliable detection and localization information about an object of interest. As illustrated in FIG. 4, model selection may involve an iterative process based on trial and error. To create a visual model (step 402) from an image labeled so as to indicate the object of interest, the robot first selects one of multiple visual-model classes from a library of visual models that has been pre-programmed into the robot (step 402A). Then, it applies the learning algorithm associated with the selected model to the annotated image to create a visual representation of the object (step 402B).

Following creation of the visual model, the robot may test its performance by simulating detection of the object using the model (step 404). This simulation involves running the detection algorithm 508, which is ordinarily used in execution mode, on an image of the object (e.g., the image used to create the model, ignoring the object outline; or a newly acquired image) to detect the object (step 404A), and determining, based on user feedback and/or a performance metric internal to the robot, whether the detection was successful (step 406B). For example, the robot may show the user in an augmented-reality camera view which object it detects, e.g., using the same or similar techniques as employed to communicate the initial object selection (in step 400) to the user. The user may be allowed to move the camera around the object to see how well the visual model works in different locations and from different perspectives; alternatively, the robot may move the camera on its own. In addition to testing detection of a static object, the robot and/or user may also determine how well the robot can track the object when it moves. For this purpose, the user may move the object, and the robot may demonstrate its tracking capabilities by following the moving object with its arm, its head, or graphics or a laser point projected onto the object, or by highlighting the object in its camera view, allowing the user to watch the tracking result on the screen. Based on the success of object-recognition and/or -tracking with the selected model, the robot may repeat the process of selecting a visual-model type, creating the representation, and testing the model until the robot and/or user determine, in step 406, that the visual model works satisfactorily and/or is the best model available.

In one embodiment, the robot tests all, or a subset, of the visual models available to it in a predetermined order. It may do so, for example, by first creating representations of the object of interest for each model, and then slowly cycling through the models, applying each in turn and presenting the user with an intuitive representation of what it is detecting, until the user indicates for a particular model that it works well. In a slightly modified version, the robot may cycle through the different approaches, but each time create a new representation of the object, varying parameters of the model so as to optimize the representation.

In another embodiment, the robot, while cycling through the different approaches, assesses internally whether it can successfully detect the object with the selected approach, and only shows good results to the user. If the robot is not confident in its learning and detection outputs—e.g., an applied detection approach does not produce valid results, or the results do not satisfy a success criterion—it moves on to a new approach. For example, if there is no detection result or the detection result is not in the same location as the selected object, then the robot knows that the learning was not successful. In some instances, the robot may exhaust all approaches and indicate to the user that it cannot achieve the goal of visually detecting the object. In yet another embodiment, the robot selects an approach randomly, and continue the trial-and-error process until it is either successful or all visual models have been tested.

In certain embodiments, the robot takes advantage of contextual information to select a visual-model class based on a relationship between class and context that has either been predetermined or learned during previous training procedures. This relationship may be represented internally by, e.g., a probabilistic graphical model or a state machine with fixed transitions based on user input and internal confidence measures. For example, the robot may select the most frequently learned visual-model class instead of a less frequently learned one. In some embodiments, the robot presents specific questions about the object to the user, and uses the answers to select a vision approach.

Regardless how the robot selects the visual model, the details of its choice are typically hidden from the user, and in their place intuitive (e.g., augmented-reality) feedback is used to elicit user feedback about the robot's performance. Decoupling user feedback from the details of the visual model in this manner allows the robot to be upgraded with more object representations without changing the overall training approach. Further, it generally relieves the human trainer from the burden of selecting visual models, rendering training easier. Of course, in certain circumstances, it may be more efficient for the user to directly select an appropriate visual model. For example, when the robot is being trained to detect boxes, the user may indicate that the robot should use a shape-based approach to detect rectangles or general quadrilaterals. Accordingly, the present invention does not exclude direct user input, but facilitates, in various embodiments, visual-model selection approaches that can do without.

In some circumstances, the object of interest is a member of a class of objects with significant intra-class variation. In order to train the robot to identify members of the class generically, the user may indicate at the beginning of the training procedure that it will show the robot multiple instances of the class. The robot may then abstract general class characteristics from the visual representations of the individual members used in the training process, enabling it to detect these as well as other class members in the future. For example, the robot may be shown multiple circular objects that vary in their color. The robot can represent the color variation with a probability distribution.

Further, in some embodiments, the user may supplement the robot-generated visual representation with information about the object that the robot is not equipped to sense itself. For example, the user may, at the request of the robot, enter real-world dimensions, weight, crush strength, or other physical parameters of the object.

Figure 6:
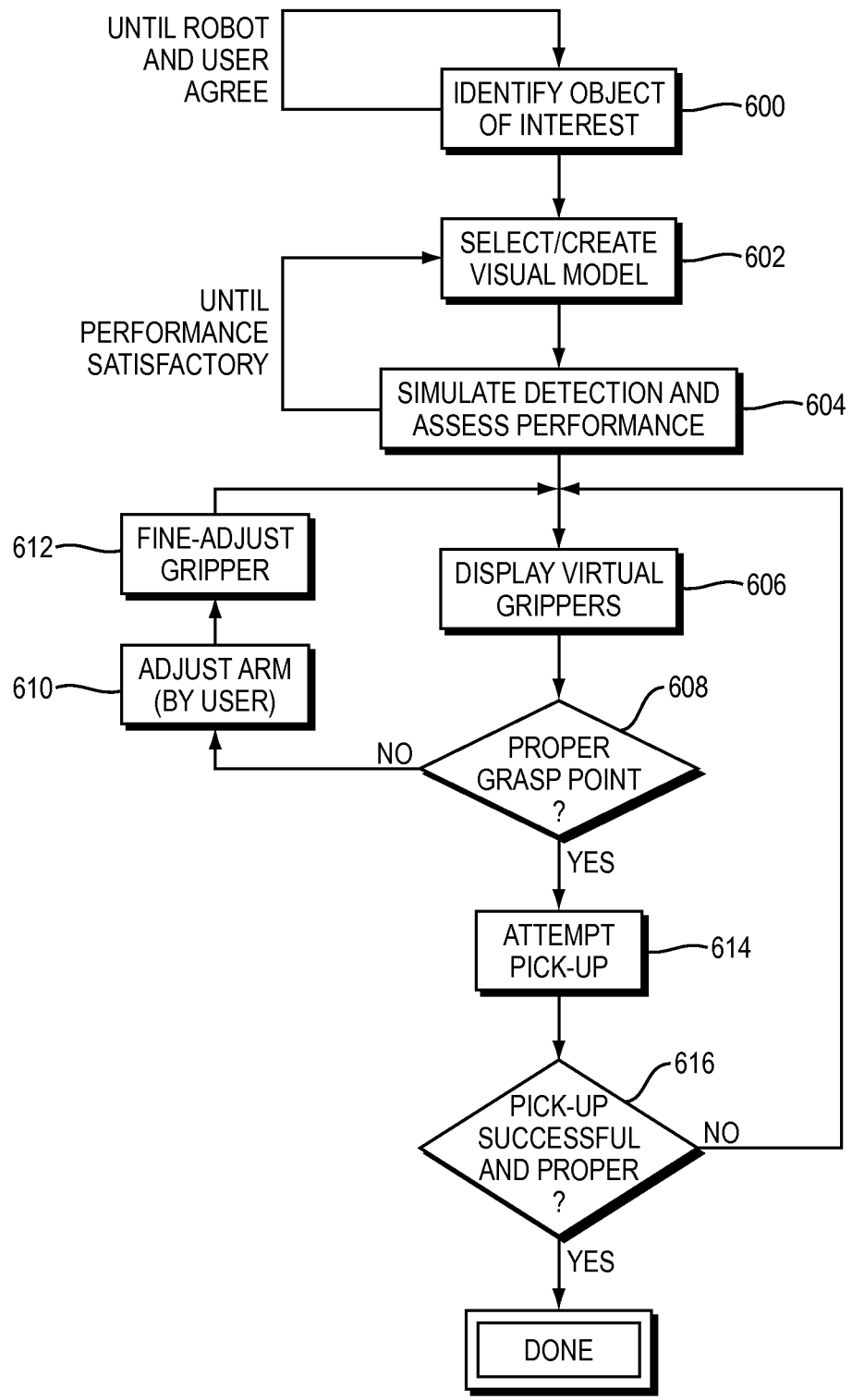
FIG. 6 is a flow chart illustrating a training method for picking up an object in accordance with various embodiments.

FIG. 6 illustrates, as a second example of specific training procedures, a process for training the robot how to grasp and pick up an object. The user knows which object is to be picked up, where this object is located in the workspace, where it appears in the camera view, and where it should be grasped. The robot needs to elicit this information in order to determine more precise data needed to perform the task, such as the object shape, a proper viewing distance, and the desired orientation of its grippers relative to the object for the grasp.

In a first step 600, the robot identifies the object of interest based on user input; this step may be accomplished in the same or a similar manner as described above with FIG. 4. The user may begin the training process by indicating the object of interest, for example, by moving the robot's arm to position the camera in the gripper above and viewing the object. Once the user releases the arm, the robot may search the camera image for a group of pixels that most likely corresponds to the object of interest, overlay an object outline on the image, move its camera to optimal viewing height, and move its arm into a position and orientation that are horizontally centered above and aligned with the object. It may then request feedback from the user. The user may confirm the robot's object outline and arm position, or reposition the camera and/or the object to signal that the robot should try again.

Once the robot has received the user's confirmation, it may analyze the pixels corresponding to the object and selects a suitable visual representation and algorithm to reliably detect and localize the object enclosed by the agreed-upon outline (step 602, which is the same as or similar to step 402 of FIG. 4). It may then present to the user how well it can detect the object, e.g., by providing a different overlay on its screen, indicating whether the object is detected and where it is located, and soliciting user feedback (step 604, which the same as or similar to step 404 of FIG. 4). The robot may repeat the process of selecting (step 602) and testing (step 604) visual models until the user confirms the robot's ability to successfully detect the object.

Following the user's approval of the selected visual model, the robot may overlay virtual grippers on the image (or video stream) of the object to indicate where the grasp point would be, given the current arm location and orientation (step 606). Thus, without the need to actually lower the gripper and bring it in contact with the object (which could be a cumbersome and, in some instance, even dangerous procedure), the robot can give the user a sense of the likelihood of a successful pick-up. If the virtual gripper is not positioned around the proper part of the object (as determined in step 608), the user may adjust the arm to roughly establish the proper grasp point (step 610). The robot may then fine-tune the arm location to optimize the gripper location relative to the rough grasp point on the object (step 612). This process of coarse and fine adjustments of the gripper by the human trainer and the robot, respectively, may be iterated until the user is satisfied with the grasp point and gripper orientation shown in the visual display.

The robot next attempts to pick up the object (step 614). If the attempt fails, the robot may try again several times, each time adjusting its gripper slightly relative to the object. The robot may identify a failed pick-up, for example, based on the absence of a weight pulling down on its gripper when the gripper is lifted. Alternatively, it may request user feedback. If the robot succeeds in lifting the object off the ground, it may await user confirmation (step 616) that the pick-up is proper. If the object is lifted, for example, in an unsafe manner, the user may disapprove, causing the robot to return to the process of establishing a proper grasp point (steps 608, 610, 612, 614). If the successful lift-off involves movements in any way inconsistent with the parameters of the corresponding prototype subtask, the subtask may be altered to conform.

In some embodiments, the visual representation of an object informs the robot beyond the purpose of detecting and localizing that type of object in images. For example, knowing the shape of an object may help the robot choose an appropriate grasping strategy. If the representation describes, for instance, an object with a hollow (e.g., cylindrical) body and a handle (e.g., akin to a mug), the robot may attempt to pick up the object by its handle. More generally, representations of objects, or classes of objects, may have specific routines for picking up or otherwise manipulating the object associated with them. Container objects, for example, may have associated routines for opening or closing the containers, which vary between classes of containers. Thus, the robot's end-effector would undergo different motions to open a cylindrical container with a lid than it would to open a cardboard box. The robot may learn these special routines during training, and associate them with particular visual representations. Alternatively, the routines may be programmed into the robot at the outset and altered, as necessary, during training as noted above. If the robot, in training or execution mode, detects an object that does not have an associated special manipulation routine, it may execute a generic pick-up or other manipulation routine. In some embodiments, the robot stores a plurality of action templates, e.g., in the form of prototypes for manipulations, and the robot and/or user may select one of the templates to indicate a present training objective. For example, the user may select an action template from a list, or the robot may select the action template automatically based on sensor input and context. If the robot detects, for instance, a conveyor belt, it may select an action for picking up objects from the conveyor belt.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. In particular, embodiments of the invention need not include all of the features or have all of the advantages described herein. Rather, they may possess any subset or combination of features and advantages. Accordingly, the described embodiments are to be considered in all respects as only illustrative and not restrictive.

What is claimed is:

1. A method of training a robot to complete a specified task comprising performing an action on an object, the robot having at least one appendage for manipulating the object and a machine-vision system for capturing images within a camera field of view, the method comprising:

(a) selecting, by the robot, an object in the field of view and displaying the selection on a robot-controlled visual display, the displayed selection including a camera view of the selected object;

(b) overlaying, by the robot, a representation of an end-effector onto the camera view and displaying, on the display, performance of an action on the object by the end-effector;

(c) based on the displayed performance, providing feedback to the robot indicating whether the action is performed correctly, the robot modifying the performance of the action in response to the feedback; and (d) repeating steps (b) through (c) until the action is performed correctly on the display.

2. The method of claim 1, wherein the robot selects the action from a plurality of stored action templates.

3. The method of claim 1, wherein the end-effector is a gripper and the action comprises gripping the object, the feedback indicating whether the displayed grippers have gripped a proper part of the displayed object.

4. The method of claim 1, wherein the feedback comprises movement of the at least one appendage by the user.

5. A vision-guided robot trainable, via interactions with a human trainer, to complete a specified task comprising performing an action on an object, the robot comprising:

at least one movable appendage comprising an end-effector for performing the action on the object;

a machine-vision system comprising at least one camera for capturing images within a camera field of view and an image-processing module for identifying objects within the captured images;

a user interface comprising (i) a robot-controlled visual display for visually displaying performance of the action on the object in a camera view thereof using a robot-generated graphic representation of the end-effector, and (ii) at least one input device for receiving feedback from the trainer indicating whether the action is performed correctly on the display; and a control system for modifying performance of the action on the display in response to the feedback until the action is performed correctly on the display.

6. The robot of claim 5, wherein the end-effector is a gripper.

7. The robot of claim 5, wherein the control system comprises a data storage medium for storing a plurality of action templates.

8. The robot of claim 5, wherein the at least one input device comprises the at least one appendage.

9. A robot-implemented method of manipulating objects based on visual recognition thereof, the method comprising causing a robot to execute steps comprising:

(a) selecting an object in a camera field of view;

(b) computationally selecting a visual model from among a plurality of computer-implemented visual models, each of the visual models including an associated algorithm, the associated algorithm for each visual model being distinct from the other algorithms;

(c) using the selected visual model to computationally identify the object based on a stored representation thereof associated with the model;

(d) determining whether an object-specific manipulation routine is stored in association with the stored representation; and (e) if so, executing the object-specific manipulation routine, and if not, executing a generic manipulation routine.

10. A vision-guided robot for manipulating objects based on visual recognition thereof, the robot comprising:

at least one movable appendage for manipulating objects;

a camera for capturing an image within a camera field of view; and a control system for (i) computationally selecting a visual model from among a plurality of computer-implemented visual models, each of the visual models including an associated algorithm, the associated algorithm for each visual model being distinct from the other algorithms, (ii) computationally identifying an object in the image based on a representation thereof stored in association with the selected visual model, (iii) determining whether an object-specific manipulation routine is stored in association with the stored representation, and (iv) if so, causing the at least one movably appendage to execute the object-specific manipulation routine, and if not, causing the at least one movable appendage to execute a generic manipulation routine.

11. The robot of claim 10, wherein the control system comprises a data storage medium storing a plurality of visual models and object representations associated therewith.

* * * * *